(12) United States Patent
Takagi (10) Patent No.: US 7,216,075 B2
(45) Date of Patent: May 8, 2007

(54) SPEECH RECOGNITION METHOD AND APPARATUS WITH NOISE ADAPTIVE STANDARD PATTERN

(75) Inventor: Keizaburo Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/163,710

(22) Filed: Jun. 6, 2002

(65) Prior Publication Data

US 2002/0198709 A1 Dec. 26, 2002

(30) Foreign Application Priority Data

Jun. 8, 2001 (JP) .............................. 2001-174148

(51) Int. Cl.
*G10L 15/20* (2006.01)
(52) U.S. Cl. ....................... 704/233; 238/256; 238/252
(58) Field of Classification Search ................ 704/256, 704/253, 238, 239, 248, 233
See application file for complete search history.

(56) References Cited

U.S. PATENT DOCUMENTS

| 4,530,110 | A | * | 7/1985 | Nojiri et al. ................. 704/239 |
| 5,819,223 | A | * | 10/1998 | Takagi ......................... 704/256 |
| 5,953,699 | A | * | 9/1999 | Takagi ......................... 704/238 |
| 6,216,103 | B1 | * | 4/2001 | Wu et al. ..................... 704/253 |
| 6,324,509 | B1 | * | 11/2001 | Bi et al. ...................... 704/248 |

FOREIGN PATENT DOCUMENTS

| JP | 09-198079 | 7/1997 |
| JP | 10-133688 | 5/1998 |

OTHER PUBLICATIONS

Lin et al., "GA-based noise speech recognition using two-dimensional cepstrum", IEEE transaction on speech and audio processing, vol. 8 No. 6, Nov. 2000, p. 664-675.*
Sae-Tang et al., "Feature windowing-based for Thai Text-dependent speaker identification using MLP with backpropagation algorithm", ISCAS 2000—IEEE international symposium on Circurts and Systems, May 28-31,2000, p. III-579-582.*
Guerchi et al., "Low-rate quantization of spectral information in a 4KB/s pitch-synchronous CELP docer", IEEE Workshop on Speech Coding, Sep. 2000, p. 111-113.*

* cited by examiner

*Primary Examiner*—Richemond Dorvil
*Assistant Examiner*—Qi Han
(74) *Attorney, Agent, or Firm*—Scully, Scott, Murphy & Presser, P.C.

(57) ABSTRACT

In a speech recognition method, at least two standard feature vector series having different signal-to-noise ratios (SNRs) are prepared in advance for each category. Then, an SNR is calculated from an input speech signal, and a noise adaptive standard feature vector series is calculated by a linear interpolation method between the prepared standard feature vector series using the calculated SNR. Finally, a dynamic programming matching operation is performed upon the feature vectors of the noise adaptive standard feature vector series and the feature vectors of the input speech signal.

10 Claims, 5 Drawing Sheets

SPEECH RECOGNITION METHOD AND APPARATUS WITH NOISE ADAPTIVE STANDARD PATTERN

BACKGROUND OF THE INVENTION

1. Field of Invention

The present invention relates to a noise adaptive speech recognition method and apparatus.

2. Description of the Related Art

In order to recognize speech in a noisy environment, various speech recognition methods have been suggested.

A first prior art speech recognition method is based on a noise superposition learning technology which superposes noise data onto a standard speech signal to prepare noise adaptive standard speech data, since the noise data is known to some extent in a noisy environment during speech recognition. Thus, the noise condition of a learning environment is brought close to that of a recognized environment, to improve the performance of speech recognition in a noisy environment (see JP-A-9-198079).

In the above-described first prior art speech recognition method, however, even when a noisy environment is recognized in advance, the voice level of a speaker, the distance between the speaker and a microphone, the volume gain of an apparatus, the noise level and the like fluctuate on a time basis, so that a signal-to-noise ratio (SNR) also fluctuates on a time basis independent of the recognized noisy environment. Since a correlation between the SNR and the performance of speech recognition is very high, the fluctuation of the SNR would invalidate the noise learning effect of the above-described first prior art speech recognition method.

In a second prior art speech recognition method, two standard feature vector series having different SNRs such as 0 dB and 40 dB are prepared in advance for each category such as "hakata". Then, a distance between a segment linking two corresponding standard feature vectors of the vector series and a feature vector of an input speech signal is calculated at each point of a two-dimensional grid formed by the input speech signal. Finally, a minimum value of the accumulated distances for categories are found and a final category having such a minimum accumulated distance is determined as a recognition result. Therefore, standard feature vectors can be adapted to any value of SNR between 0 dB and 40 dB, so as to obtain high performance speech recognition (see JP-A-10-133688) and U.S. Pat. No. 5,953,699.

In the above-described second prior art speech recognition method, however, the amount of calculation of the above-mentioned distances based upon three points, i.e., two standard feature vectors and one feature vector of an input speech signal at each grid point is enormous, which would increase the manufacturing cost of a speech recognition apparatus.

Also, in the above-described second prior art speech recognition method, since individual optimization is carried out at each grid point, when a range of corresponding standard feature vectors of the two feature vector series for one grid point interferes with a range of standard feature vectors for an adjacent grid point, an overmatching or mismatching operation would be carried out. That is, the power of a consonant is relatively small compared with a vowel. Therefore, when the SNR is too small, the power of noise would become equivalent to the power of consonants. For example, the first consonant such as "h" of the category "hakata" is buried in the noise. Thus, the category "hakata" is deformed to a category "akata". At worst, all the consonants such as "h", "k" and "t" of the category "hakata" are buried in the noise. Thus, the category "hakata" is deformed to a category "aaa".

SUMMARY OF THE INVENTION

It is an object of the present invention to provide a noise adaptive speech recognition method and apparatus capable of decreasing the calculation amount and avoiding the overmatching or mismatching operation.

According to the present invention, at least two standard feature vector series having different SNRs are prepared in advance for each category. Then, an SNR is calculated from an input speech signal, and a noise adaptive standard feature vector series is calculated by a linear interpolation method between the prepared standard feature vector series using the calculated SNR. Finally, a dynamic programming matching operation is performed upon the feature vectors of the noise adaptive standard feature vector series and the feature vectors of the input speech signal.

BRIEF DESCRIPTION OF THE DRAWINGS

The present invention will be more clearly understood from the description set forth below, with reference to the accompanying drawings, wherein.

DESCRIPTION OF THE PREFERRED EMBODIMENTS

Before the description of the preferred embodiments, the principle of the present invention will be now explained.

Generally, an input speech signal is a superposition signal of a pure speech signal and a noise signal in a linear spectrum region. Therefore, when a speech recognition is carried out in a predictable noisy environment, a noise signal is recorded in advance and is superposed onto standard speaker's speech signals, so that the noise condition of a recognized environment coincides with that of a learning environment. This is called a noise superposition learning method. Note that, as explained above, even when the power spectrum of a noisy environment is recognized in advance, the voice level of a speaker, the distance between the speaker and a microphone, the volume gain of an apparatus and the like fluctuate on a time basis, so that the SNR also fluctuates on a time basis independent of the noise condition of the recognized environment. Therefore, in the noise superposition learning method, an unknown parameter for defining the SNR has to be considered.

Now, a noise is considered to be superposed onto a pure speech signal, to form a speech signal under noisy conditions. That is, where superscript "L" indicates a linear representation $$Y^L = S^L + \alpha^L \cdot N^L \quad (1)$$

where $Y^L$ is a power spectrum of a speech signal observed in a noisy environment;

$S^L$ is a power spectrum of a pure speech component of the speech signal $Y^L$;

$N^L$ is a power spectrum of a noise signal; and $\alpha^L$ is a gain of the noise signal.

Note that the gain $\alpha^L$ allocated to the noise $N^L$ can be treated as the SNR.

In most of speech recognition apparatuses, a recognition parameter uses a logarithmic spectrum or its linearly converted parameter such as a cepstrum. Note that the cepstrum is a simple, linear conversion of the logarithmic spectrum. For simplifying the description, formula (1) is converted into a logarithmic spectrum form, i.e., $$\begin{aligned} Y &= \log(Y^L) \\ &= \log(S^L + \alpha^L \cdot N^L) \\ &= \log\{\exp(S) + \exp(\alpha \cdot N)\} \\ &\approx f(\alpha \cdot N) \end{aligned} \quad (2)$$

where
$S = \log(S^L)$
$N = \log(N^L)$
$\alpha = \log(\alpha^L)$

In formula (2), although the speech signal Y can be calculated by a given noise and a given gain $\alpha$, the calculation of the speech signal Y actually needs a lot of calculation resources due to the presence of transcendental functions such as logarithmic functions and exponential functions. In the present invention, formula (2) is approximated by the linear terms of a Taylor expansion:

$$\delta(\alpha, N) = \quad (3)$$
$$f(\alpha_0, N_0) + \frac{d}{d\alpha}f(\alpha_0, N_0)\{\alpha - \alpha_0\} + \frac{d}{dN}f(\alpha_0 + N_0)\{N - N_0\}$$

where $f(\alpha_0, N_0)$ is a standard pattern onto which a reference noise spectrum $N_0$ with a reference gain $\alpha_0$ is superposed. If the noise N per se is not changed in this noisy environment, formula (3) is replaced by:

$$\begin{aligned} f(\alpha, N) &= f(\alpha_0, N_0) + (\alpha - \alpha_0)d(f(\alpha_0, N_0)/d\alpha \\ &= f_0 + (f_1, f_0) \cdot (SNR - SNR_0)/(SNR_1 - SNR_0) \end{aligned} \quad (4)$$

where $f_0(=f(\alpha_0, N_0))$ is a standard pattern, i.e., a standard feature vector series at $SNR=SNR_0$;

$f_1(=f(\alpha_1, N_1))$ is a standard pattern, i.e., a standard feature vector series at $SNR=SNR_1$; and SNR is a SNR calculated for an unknown input speech signal.

Thus, an arbitrary standard pattern, i.e., a arbitrary standard feature vector series is calculated by a linear interpolation method between known standard patterns, i.e., known standard feature vector series using the calculated SNR based upon formula (4).

Figure 1:
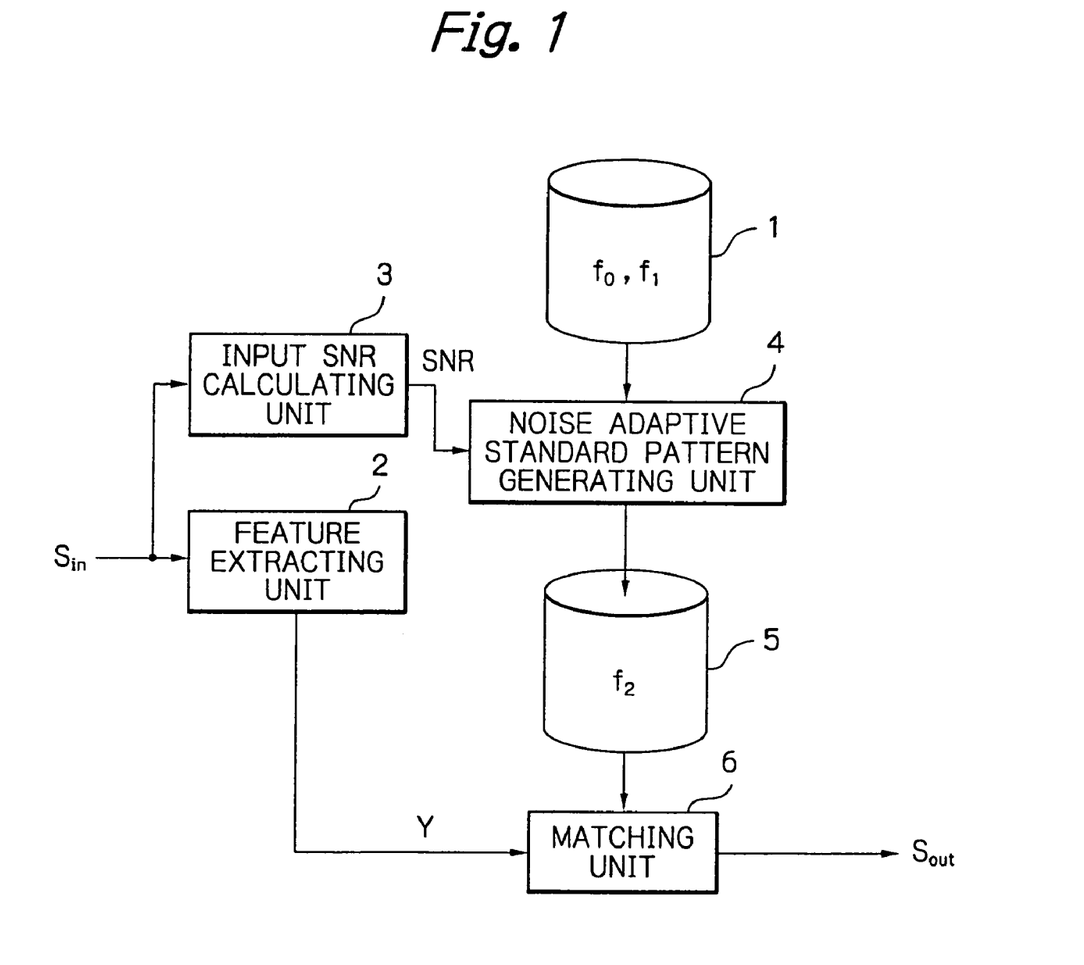
FIG. 1 is a block circuit diagram illustrating a first embodiment of the speech recognition apparatus according to the present invention.

In FIG. 1, which illustrates a first embodiment of the speech recognition apparatus according to the present invention, an SNR multiplexed standard pattern storing unit 1 stores two standard patterns per one category, i.e., two standard feature vector series per one category onto which different noises associated with $SNR_0$ and $SNR_1$ are superposed. In this case, if the standard patterns each having a length of m are denoted by $f_0$ and $f_1$, respectively, $f_0$ and $f_1$ are feature vector series represented by:

$$f_0 = \{\mu_1, \mu_2, \ldots, \mu_m\} \quad (5)$$

$$f_1 = \{\hat{\mu}_1, \hat{\mu}_2, \ldots, \hat{\mu}_m\} \quad (6)$$

where $\mu_1, \mu_2, \ldots, \mu_m, \hat{\mu}_1, \hat{\mu}_2, \ldots, \hat{\mu}_m$ are feature vectors on a time basis which are represented by:

$$\mu_i = (\mu_{i1}, \mu_{i2}, \ldots, \mu_{in}) \quad (7)$$

$$\hat{\mu}_i = (\hat{\mu}_{i1}, \hat{\mu}_{i2}, \ldots, \hat{\mu}_{in}) \quad (8)$$

where n is a dimension of the feature vectors.

Note that feature vectors are obtained by analyzing waveforms of a speech signal at every predetermined short time period using a spectrum analysis output, a filter back output, a cepstrum or power, and arranging multi-dimensional vector results on a time basis.

A feature extracting unit 2 receives an input speech signal $S_{in}$ to analyze the waveforms thereof, thus calculating a feature pattern, i.e., a feature vector series denoted by Y:

$$Y = \{Y_1, Y_2, \ldots, Y_m\} \quad (9)$$

$$\text{where } Y_i = (Y_{i1}, Y_{i2}, \ldots, Y^{in}) \quad (10)$$

An input SNR calculating unit 3 receives the input speech signal $S_{in}$ to calculate an SNR thereof. The SNR of the input signal $S_{in}$ is represented by:

$$SNR = 10 \log(P_s) - 10 \log(P_n) \quad (11)$$

where $P_s$ is an average power of a speech component of the input speech signal $S_{in}$; and $P_n$ is an average power of a noise component of the input speech signal $S_{in}$. Generally, the SNR of the input speech signal $S_{in}$ is approximated by:

$$SNR = 10\log\left(\frac{P_s}{P_n}\right) = 10\log\left(\frac{\sum_{t \in T_s} x^2(t)}{\sum_{t \in T_n} x^2(t)}\right) \quad (12)$$

where x(t) is a power of the input speech signal $S_{in}$ at time t;

$T_s$ is a set of speech time periods; and $T_n$ is a set of noise time periods. For example, a short time period is determined to be a speech time period or a noise time period by whether or not the power of the input speech signal Sin during the short time period is higher than a threshold value.

A speech segmentation unit (not shown) for detecting speech segmentation points in the input speech signal Sin is connected to the feature extracting unit 2 and the input SNR calculating unit 3. However, since the speech segmentation unit has no relationship to the present invention, the detailed description thereof is omitted.

A noise adaptive standard pattern generating unit 4 receives the standard patterns $f_0$ and $f_1$ (see formulae (5), (6), (7) and (8)) from the SNR multiplexed standard pattern storing unit 1 and the SNR from the input SNR calculating unit 3 to generate a noise adaptive standard pattern, i.e., a noise adaptive feature vector series $f_2$ by using formula (4):

$$f_2 = f_0 + (f_0 - f_0) \cdot (SNR - SNR_0)/(SNR_1 - SNR_0) \tag{13}$$

Then, the noise adaptive standard pattern $f_2$ is stored in a noise adaptive standard pattern storing unit 5.

A matching unit 6 performs a nonlinear expansion and reduction matching operation such as a Viterbi matching operation using a Hidden Markov Model (HMM) or a dynamic program (DP) matching operation upon the feature vector series Y of the input speech signal $S_{in}$ and the standard pattern (feature vector series) $f_2$. As a result, a final category is determined and outputted as an output signal $S_{out}$.

In the speech recognition apparatus of FIG. 1, note that there are actually a plurality of categories. Also, although only two standard patterns are prepared for each category, three or more standard patterns can be prepared. In this case, two of the standard patterns having SNR values closer to the SNR calculated by the input SNR calculating unit 3 are selected, and a noise adaptive standard pattern $f_2$ is calculated by the noise adaptive standard pattern generating unit 4 in accordance with the selected two standard patterns.

In the speech recognition apparatus of FIG. 1, since the noise adaptive standard pattern generating unit 4 and the matching unit 6 are operated in accordance with the SNR calculated by the input SNR calculating unit 3, a large delay time may occur, which is not practical. Note that, in most speech recognition apparatuses, a frame synchronization is carried out, so that parts of an input speech signal are sequentially treated, which decreases the delay time.

In order to decrease the delay time of the speech recognition apparatus of FIG. 1, one approach is that the input SNR calculating unit 3 calculates an SNR in accordance with a part of the input speech signal $S_{in}$. For example, use is made of a noise component before the generation of the input speech signal $S_{in}$ and a first part of the input speech signal $S_{in}$. Another approach is that the noise adaptive standard pattern generating unit 4 calculates a noise adaptive standard pattern in accordance with a past value of SNR previously calculated by the input SNR calculating unit 3. That is, use is made of the previous input speech signal $S_{in}$. Also, the past value of SNR can be replaced by an average value of the past values of SNR. In this case, a relative large delay time may occur only for the initial input speech signal $S_{in}$.

Figure 2:
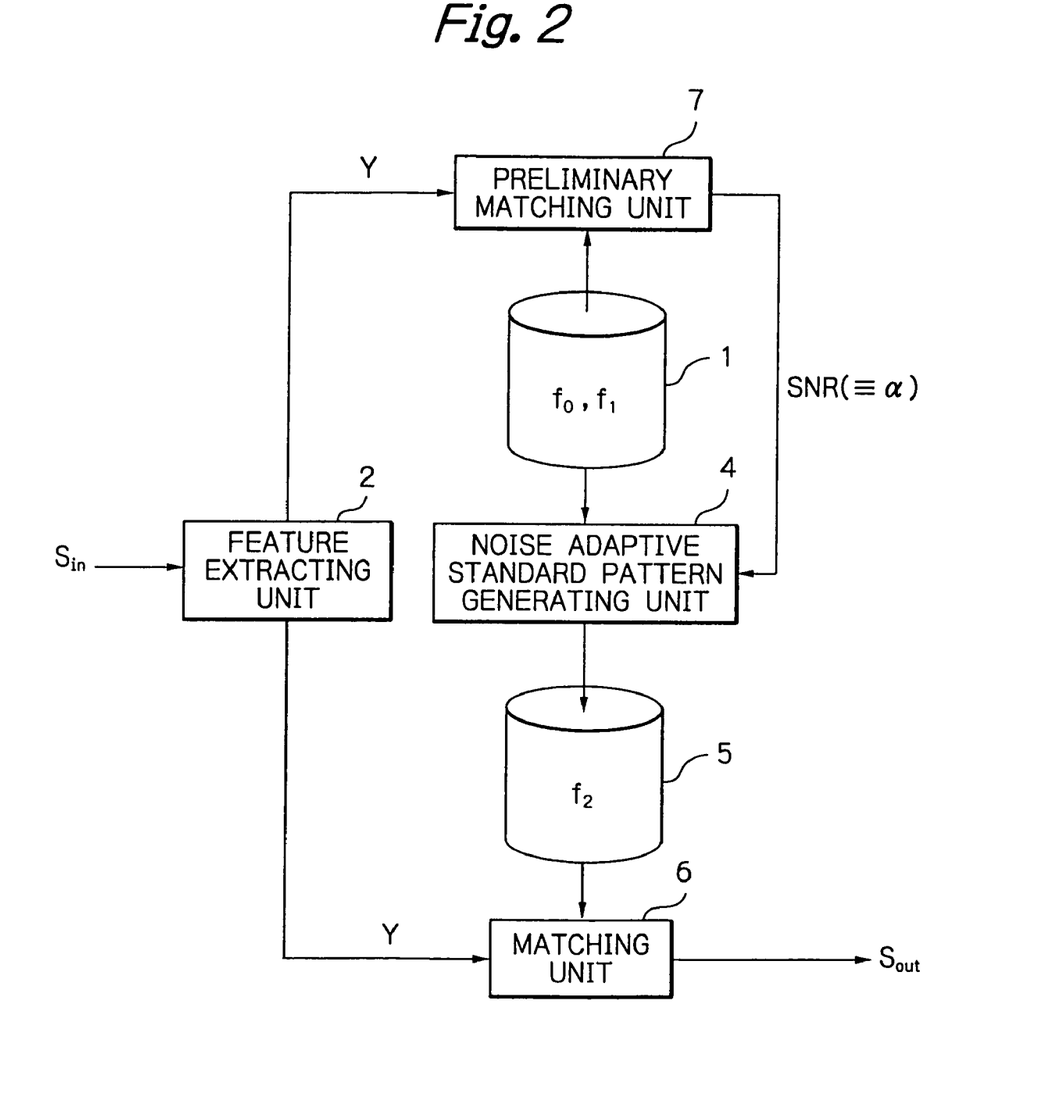
FIG. 2 is a block circuit diagram illustrating a second embodiment of the speech recognition apparatus according to the present invention.

In FIG. 2, which illustrates a second embodiment of the speech recognition apparatus according to the present invention, a preliminary matching unit 7 is provided instead of the input SNR calculating unit 3 of FIG. 1.

The preliminary matching unit 7 calculates an SNR in accordance with a matching operation such as a Viterbi matching operation or a DP matching operation.

Figure 3:
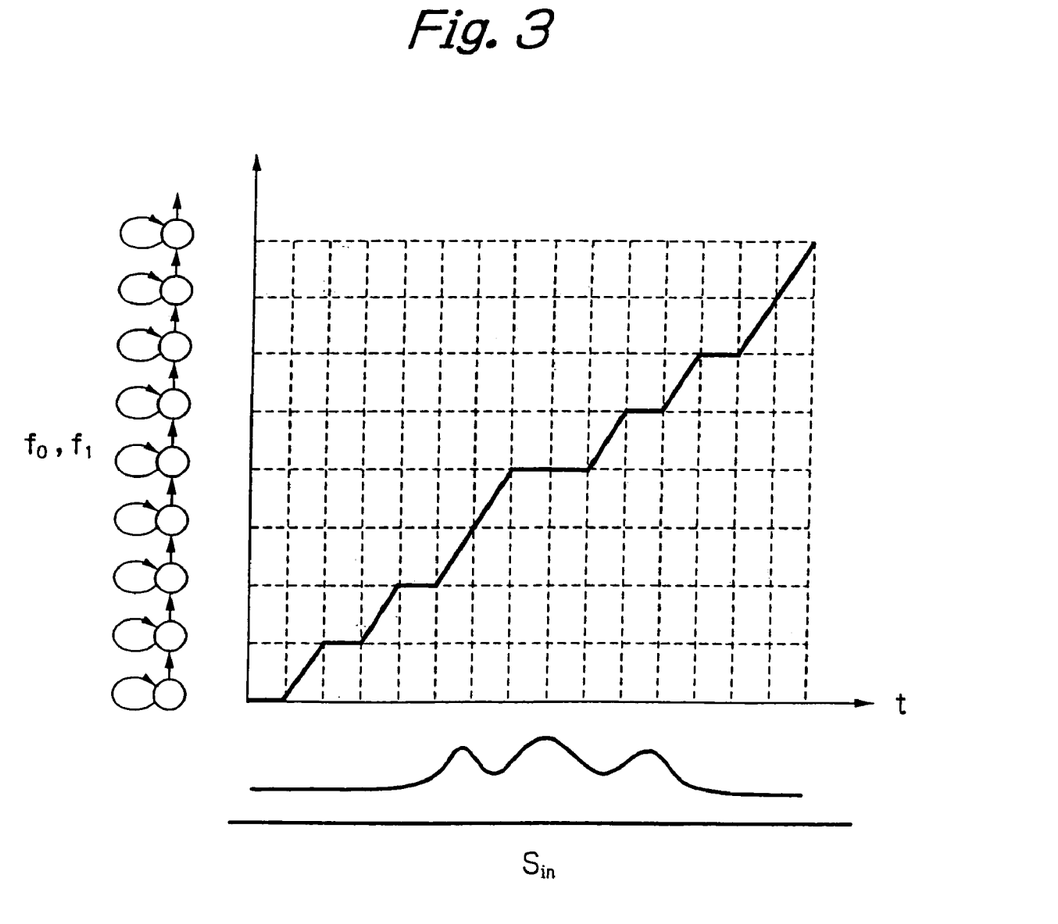
FIG. 3 is a diagram for explaining the operation of the preliminary matching unit of FIG. 2.

The operation of the preliminary matching unit 7 will be explained next with reference to FIG. 3 which shows a correct candidate path for standard patterns $f_0$ and $f_1$ in an HMM form.

The standard patterns $f_0$ and $f_1$ with different $SNR_0$ and $SNR_1$ are represented by (see formulae (5), (6), (7) and (8)):

$$\mu_{ij} \text{ and } \hat{\mu}_{ij}$$

When $\alpha = SNR$, $\mu_{ij}(\alpha)$ is given from formula (4) by $$\mu_{ij}(\alpha) = \mu_{ij} + \frac{(\hat{\mu}_{ij} - \mu_{ij})}{(\alpha_1 - \alpha_0)} \cdot (\alpha - \alpha_0) = \left[1 - \frac{(\alpha - \alpha_0)}{(\alpha_1 - \alpha_0)}\right] \cdot \mu_{ij} + \left[\frac{(\alpha - \alpha_0)}{(\alpha_1 - \alpha_0)}\right] \cdot \hat{\mu}_{ij}$$

Here, $\alpha(SNR)$ is redefined by $$\mu_{ij}(\alpha) = \alpha \cdot \mu_{ij} + (1-\alpha) \cdot \hat{\mu}_{ij}$$

Also, the feature vectors of the input speech signal $S_{in}$ is represented by (see formulae (9) and (10)):

$$Y_{ij}$$

If a deviation of $Y_{ij}$ is represented by $\delta^2_{ij}$, the accumulated distance $O(\alpha)$ between $\mu_{ij}(\hat{\mu}_{ij})$ and $Y_{ij}$ is defined by $$O(\alpha) = \sum_i \sum_j \frac{\{Y_{ij} - \mu_{ij} - (\alpha)\}^2}{\delta^2_{ij}} \tag{14}$$

$$= \sum_i \sum_j \frac{\{Y_{ij} - \alpha\mu_{ij} - (1-\alpha)\hat{\mu}_{ij}\}^2}{\delta^2_{ij}}$$

where $\alpha$ is a parameter for an unknown SNR ($\alpha$). When the accumulated distance $O(\alpha)$ is minimum, $$dO(\alpha)/d\alpha = 0$$

Therefore, $$\alpha = \frac{\sum_i \sum_j (\hat{\mu}_{ij} - \mu_{ij})(\hat{\mu}_{ij} - Y_{ij})/\delta^2_{ij}}{\sum_i \sum_j (\hat{\mu}_{ij} - \mu_{ij})(\hat{\mu}_{ij} + \mu_{ij})/\delta^2_{ij}} \tag{15}$$

Thus, the preliminary matching unit 7 calculates SNR ($=\alpha$) in accordance with formula (15). Then, the noise adaptive standard pattern calculates a noise adaptive standard pattern $f_2$ in accordance with formula (13). In this case, if a is used instead of SNR, $$f_2 = \alpha \cdot f_0 + (1-\alpha) \cdot f_1 \tag{16}$$

Figure 4:
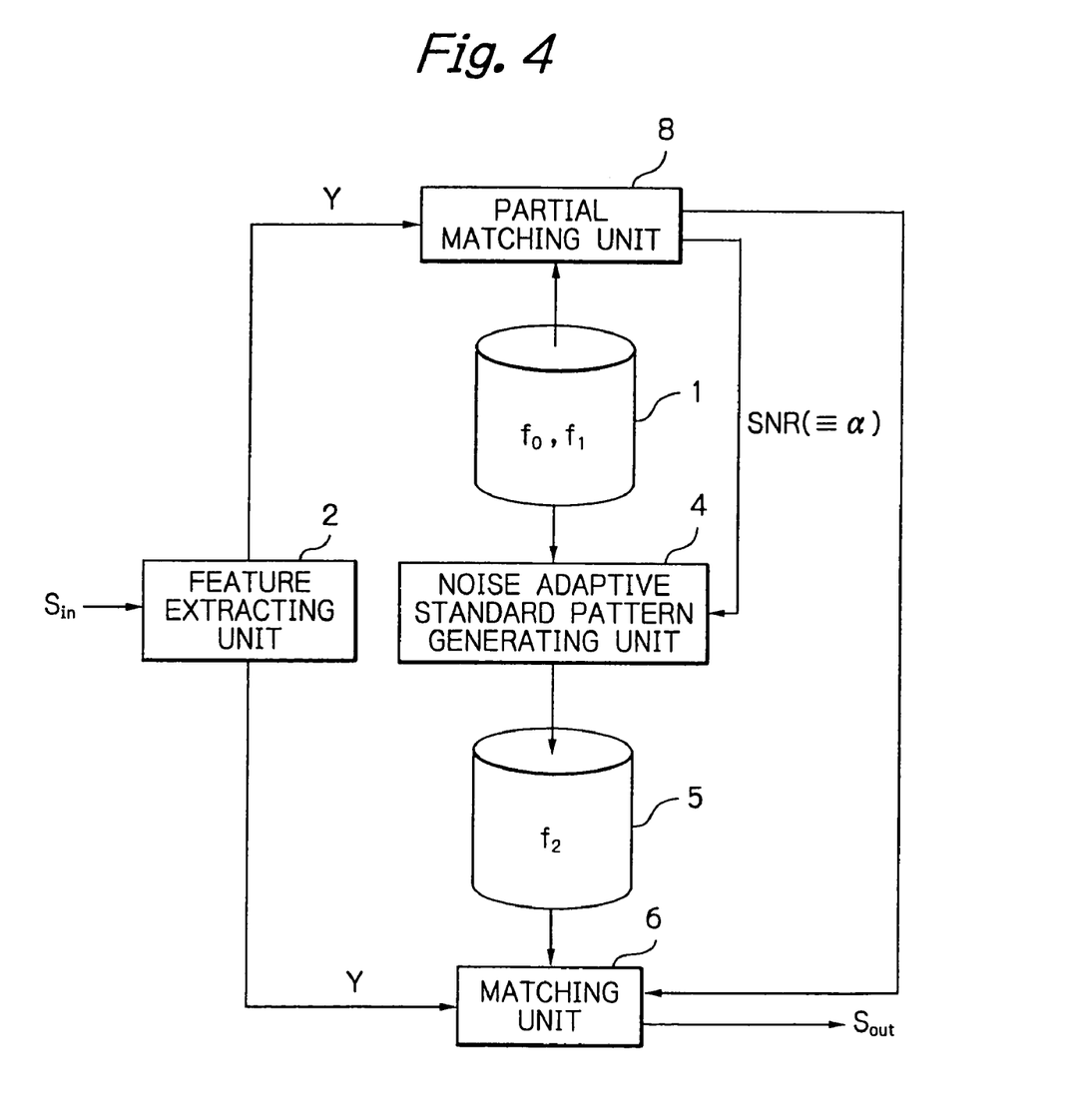
FIG. 4 is a block circuit diagram illustrating a third embodiment of the speech recognition apparatus according to the present invention.

In FIG. 4, which illustrates a third embodiment of the speech recognition apparatus according to the present invention, a partial matching unit 8 is provided instead of the preliminary matching unit 7 of FIG. 2.

The partial matching unit 8 calculates an SNR in accordance with a matching operation such as a Viterbi matching operation or a DP matching operation.

Figure 5:
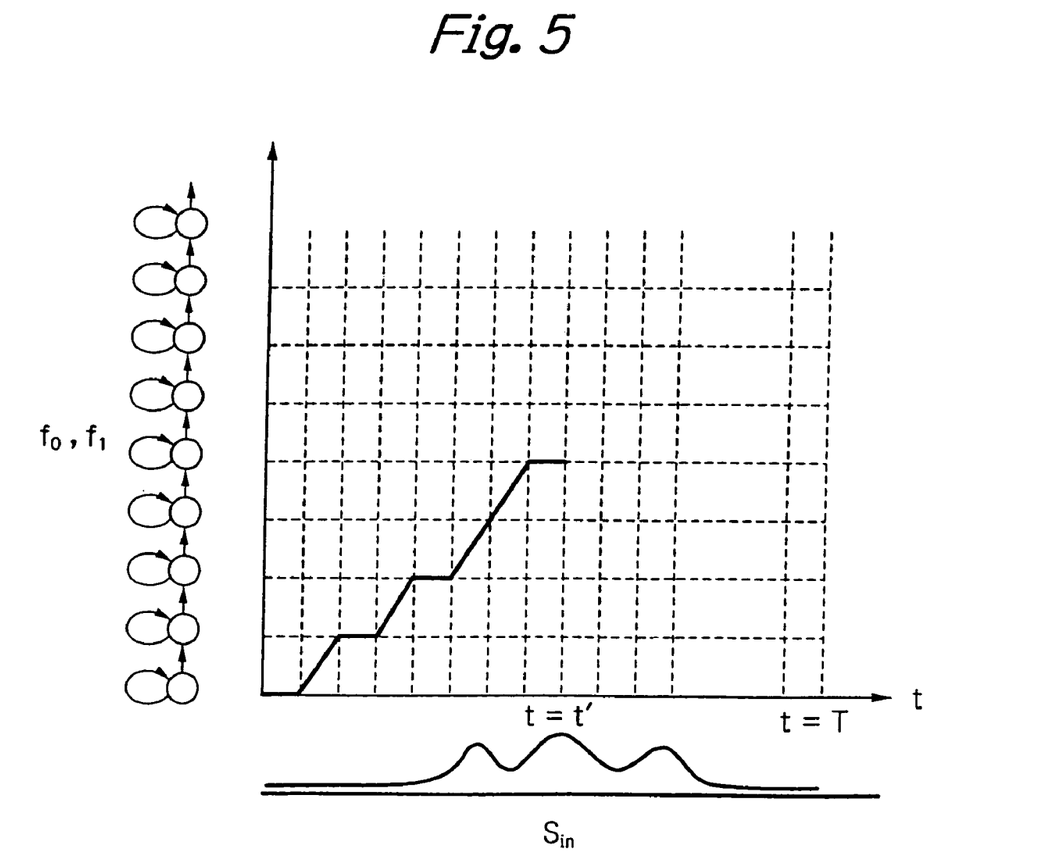
FIG. 5 is a diagram for explaining the operation of the partial matching unit of FIG. 4.

The operation of the partial matching unit 8 will be explained next with reference to FIG. 5 which shows a partial candidate path for standard patterns $f_0$ and $f_1$ in an HMM form. That is, at time t=t', a partial candidate path is obtained. Then, the noise adaptive standard pattern generating unit 4 renews a noise adaptive standard pattern $f_2$ in accordance with the partial candidate path by using formula (13) or (16). Also, at time t=t'. The matching unit 6 performs a matching operation upon the input speech signal $S_{in}$ and the renewed noise adaptive standard pattern $f_2$. Finally, at time t=T, the operations of the partial matching unit 8 and the matching unit 6 are completed and a final category is output as the output signal $S_{out}$.

As explained hereinabove, according to the present invention, since a noise adaptive SNR value ($\equiv \alpha$) is determined in advance, the amount of calculation can be decreased, thus decreasing the manufacturing cost of a speech recognition apparatus. Also, since a noise adaptive SNR value is obtained by using the entire or part of a speech signal, the overmatching or mismatching operation can be avoided.

The invention claimed is:

1. A speech recognition method for recognizing an input speech signal for a plurality of categories, comprising the steps of:

storing at least two standard feature vector series having different signal-to-noise ratios (SNRs) for each of said categories;

calculating one SNR of said input speech signal;

calculating a single noise adaptive standard feature vector series by a linear interpolation method between said standard feature vector series using said calculated SNR; and performing a dynamic programming matching operation upon feature vectors of said single noise adaptive standard feature vector series and feature vectors of said input speech signal, wherein said single noise adaptive standard feature vector series calculating step calculates said single noise adaptive standard feature vector series by $$f_2 = f_0 + (f_1 - f_0) \cdot (SNR - SNR_0)/(SNR_1 - SNR_0)$$

where $f_2$ is said single noise adaptive standard feature vector series;

$f_0$ and $f_1$ are said standard feature vector series;

$SNR_0$ and $SNR_1$ are SNRs of said standard feature vector series $f_0$ and $f_1$, respectively; and SNR is said calculated SNR of said input speech signal.

2. The method as set forth in claim 1, wherein said SNR calculating step calculates said SNR of said input speech signal by a ratio of a speech component of said input speech signal to a noise component before generation of said input speech signal.

3. The method as set forth in claim 1, wherein said single noise adaptive standard feature vector series calculating step uses an SNR calculated for a previous input speech signal of said input speech signal as said calculated SNR.

4. A speech recognition method for recognizing an input speech signal for a plurality of categories, comprising the steps of:

storing at least two standard feature vector series having different signal-to-noise ratios (SNRs) for each of said categories;

performing a preliminary matching operation upon feature vectors of said standard feature vector series and feature vectors of said input speech signal to obtain a correct candidate path, and calculating one SNR of said input speech signal so that accumulated distance along said correct candidate path is minimum;

calculating a single noise adaptive standard feature vector series by a linear interpolation method between said standard feature vector series using said calculated SNR; and performing a dynamic programming matching operation upon the feature vectors of said single noise adaptive standard feature vector series and feature vectors of said input speech signal, wherein said single noise adaptive standard feature vector series calculating step calculates said single noise adaptive standard feature vector series by $$f_2 = f_0 + (f_1 - f_0) \cdot (SNR - SNR_0)/(SNR_1 - SNR_0)$$

where $f_2$ is said single noise adaptive standard feature vector series;

$f_0$ and $f_1$ are said standard feature vector series;

$SNR_0$ and $SNR_1$ are SNRs of said standard feature vector series $f_0$ and $f_1$, respectively; and SNR is said calculated SNR of said input speech signal.

5. A speech recognition method for recognizing an input speech signal for a plurality of categories, comprising:

storing at least two standard feature vector series having different signal-to-noise ratios (SNRs) for each of said categories;

performing a partial matching operation upon feature vectors of said standard feature vector series and feature vectors of said input speech signal to obtain a partial candidate path, and calculating one intermediate SNR of said input speech signal so that accumulated distance along said partial candidate path is minimum;

calculating a single noise adaptive standard feature vector series by a linear interpolation method between said standard feature vector series using said calculated intermediate SNR; and performing a dynamic programming matching operation upon the feature vectors of said single noise adaptive standard feature vector series and feature vectors of said input speech signal, wherein said single noise adaptive standard feature vector series calculating step calculates said single noise adaptive standard feature vector series by $$f_2 = f_0 + (f_1 - f_0) \cdot (SNR - SNR_0)/(SNR_1 - SNR_0)$$

where $f_2$ is said single noise adaptive standard feature vector series;

$f_0$ and $f_1$ are said standard feature vector series;

$SNR_0$ and $SNR_1$ are SNRs of said standard feature vector series $f_0$ and $f_1$, respectively; and SNR is said calculated SNR of said input speech signal.

6. A speech recognition apparatus for recognizing an input speech signal for a plurality of categories, comprising:

a multiplexed standard pattern storing unit for storing at least two standard feature vector series having different signal-to-noise ratios (SNRs) for each of said categories;

an input SNR calculating unit for calculating one SNR of said input speech signal;

a single noise adaptive standard pattern calculating unit for calculating a single noise adaptive standard feature vector series by a linear interpolation method between said standard feature vector series using said calculated SNR; and a matching unit for performing a dynamic programming matching operation upon feature vectors of said single noise adaptive standard feature vector series and feature vectors of said input speech signal, wherein said single noise adaptive standard pattern calculating unit calculates said noise adaptive standard feature vector series by $$f_2 = f_0 + (f_1 - f_0) \cdot (SNR - SNR_0)/(SNR_1 - SNR_0)$$

where $f_2$ is said single noise adaptive standard feature vector series;

$f_0$ and $f_1$ are said standard feature vector series;

$SNR_0$ and $SNR_1$ are SNRs of said standard feature vector series $f_0$ and $f_1$, respectively; and SNR is said calculated SNR of said input speech signal.

7. The apparatus as set forth in claim 6, wherein said input SNR calculating unit calculates said SNR of said input speech signal by a ratio of a speech component of said input speech signal to a noise component before generation of said input speech signal.

8. The apparatus as set forth in claim 6, wherein said single noise adaptive standard pattern calculating unit uses an SNR calculated for a previous input speech signal of said input speech signal as said calculated SNR.

9. A speech recognition apparatus for recognizing an input speech signal for a plurality of categories, comprising:

a multiplexed standard pattern storing unit for storing at least two standard feature vector series having different signal-to-noise ratios (SNRs) for each of said categories;

a preliminary matching unit for performing a preliminary matching operation upon feature vectors of said standard feature vector series and feature vectors of said input speech signal to obtain a correct candidate path, and calculating one SNR of said input speech signal so that accumulated distance along said correct candidate path is minimum;

a single noise adaptive standard pattern calculating unit for calculating a single noise adaptive standard feature vector series by a linear interpolation method between said standard feature vector series using said calculated SNR; and a matching unit for performing a dynamic programming matching operation upon the feature vectors of said single noise adaptive standard feature vector series and feature vectors of said input speech signal, wherein said single noise adaptive standard pattern calculating unit calculates said single noise adaptive standard feature vector series by $$f_2 = f_0 + (f_1 - f_0) \cdot (SNR - SNR_0)/(SNR_1 - SNR_0)$$

where $f_2$ is said single noise adaptive standard feature vector series;

$f_0$ and $f_1$ are said standard feature vector series;

$SNR_0$ and $SNR_1$ are SNRs of said standard feature vector series $f_0$ and $f_1$, respectively; and SNR is said calculated SNR of said input speech signal.

10. A speech recognition apparatus for recognizing an input speech signal for a plurality of categories, comprising:

a multiplexed standard pattern storing unit for storing at least two standard feature vector series having different signal-to-noise ratios (SNRs) for each of said categories;

a partial matching in unit for performing a partial matching operation upon feature vectors of said standard feature vector series and feature vectors of said input speech signal to obtain a partial candidate path, and calculating one intermediate SNR of said input speech signal so that accumulated distance along said partial candidate path is minimum;

a single noise adaptive standard pattern calculating unit for calculating a single noise adaptive standard feature vector series by a linear interpolation method between said standard feature vector series using said calculated intermediate SNR; and a matching unit for performing a dynamic programming matching operation upon the feature vectors of said single noise adaptive standard feature vector series and feature vectors of said input speech signal, wherein said single noise adaptive standard pattern calculating unit calculates said single noise adaptive standard feature vector series by $$f_2 = f_0 + (f_1 - f_0) \cdot (SNR - SNR_0)/(SNR_1 - SNR_0)$$

where $f_2$ is said single noise adaptive standard feature vector series;

$f_0$ and $f_1$ are said standard feature vector series;

$SNR_0$ and $SNR_1$ are SNRs of said standard feature vector series $f_0$ and $f_1$, respectively; and SNR is said calculated SNR of said input speech signal.

* * * * *